J. J. GRUENFELD, Jr.
MACHINE FOR MAKING CONCRETE POLES.
APPLICATION FILED SEPT. 22, 1920.
1,374,730.
Patented Apr. 12, 1921.
3 SHEETS—SHEET 2.
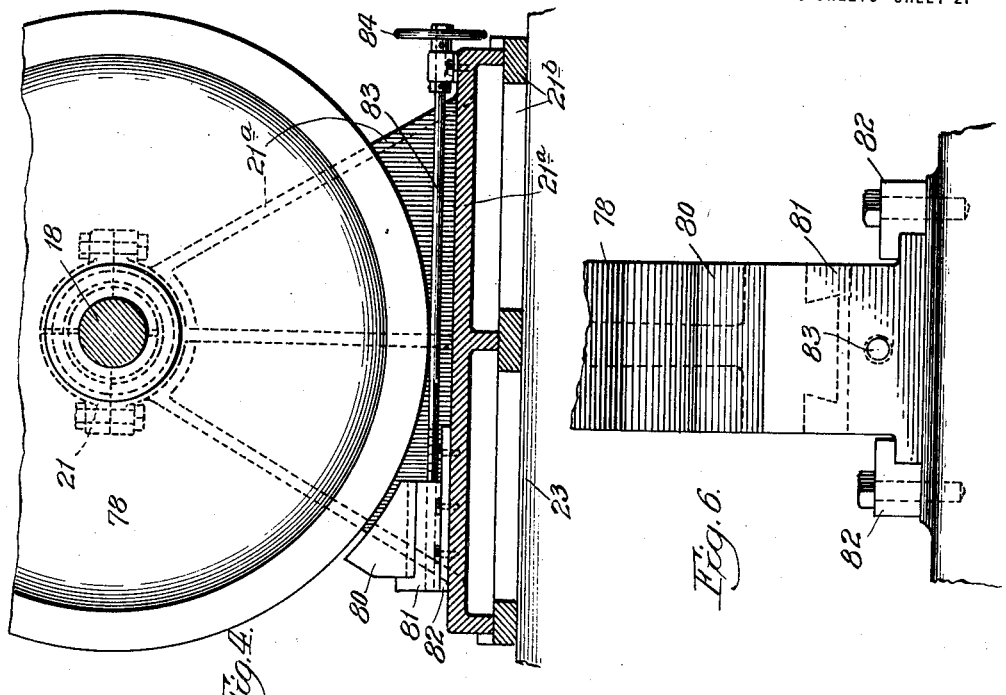
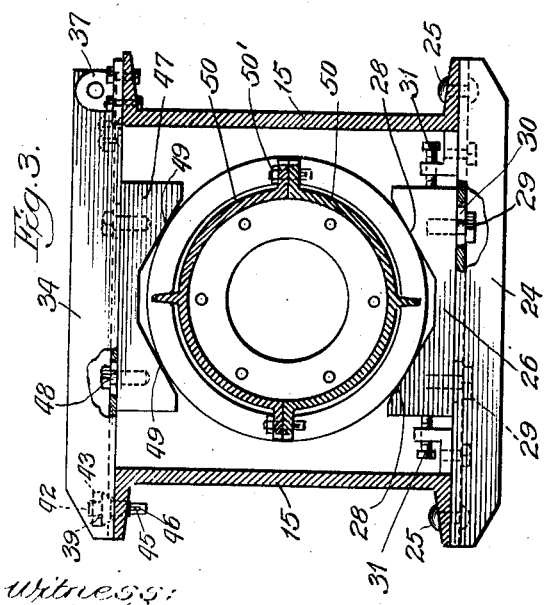
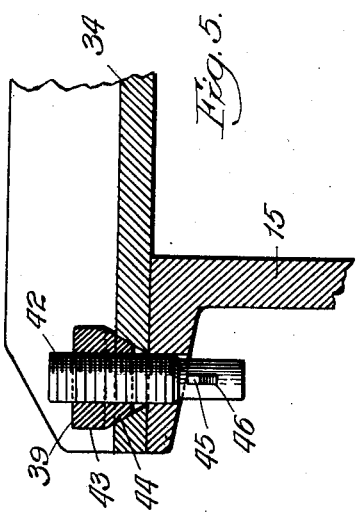
Witness:
John Enders
Inventor:
Julius J. Gruenfeld Jr.
by Fred Gerlach
his Atty.

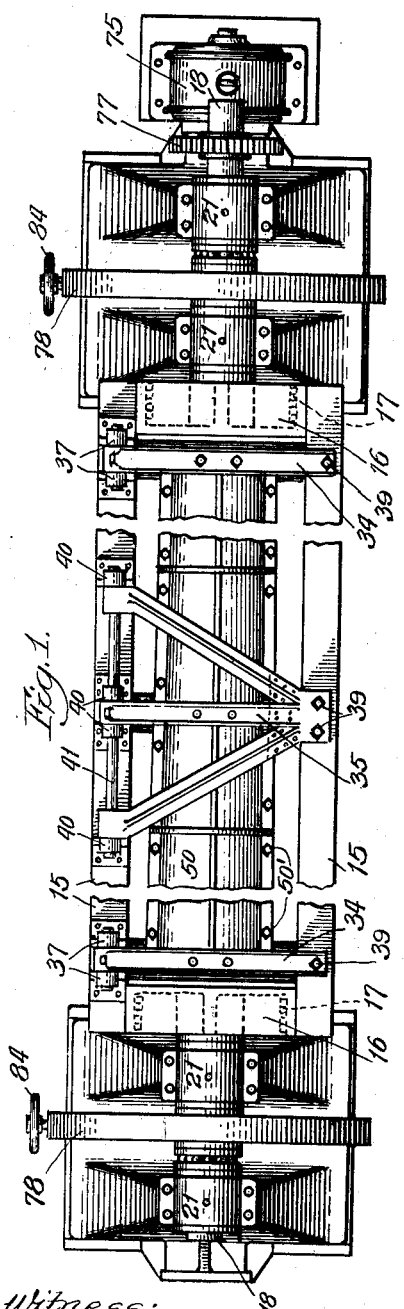

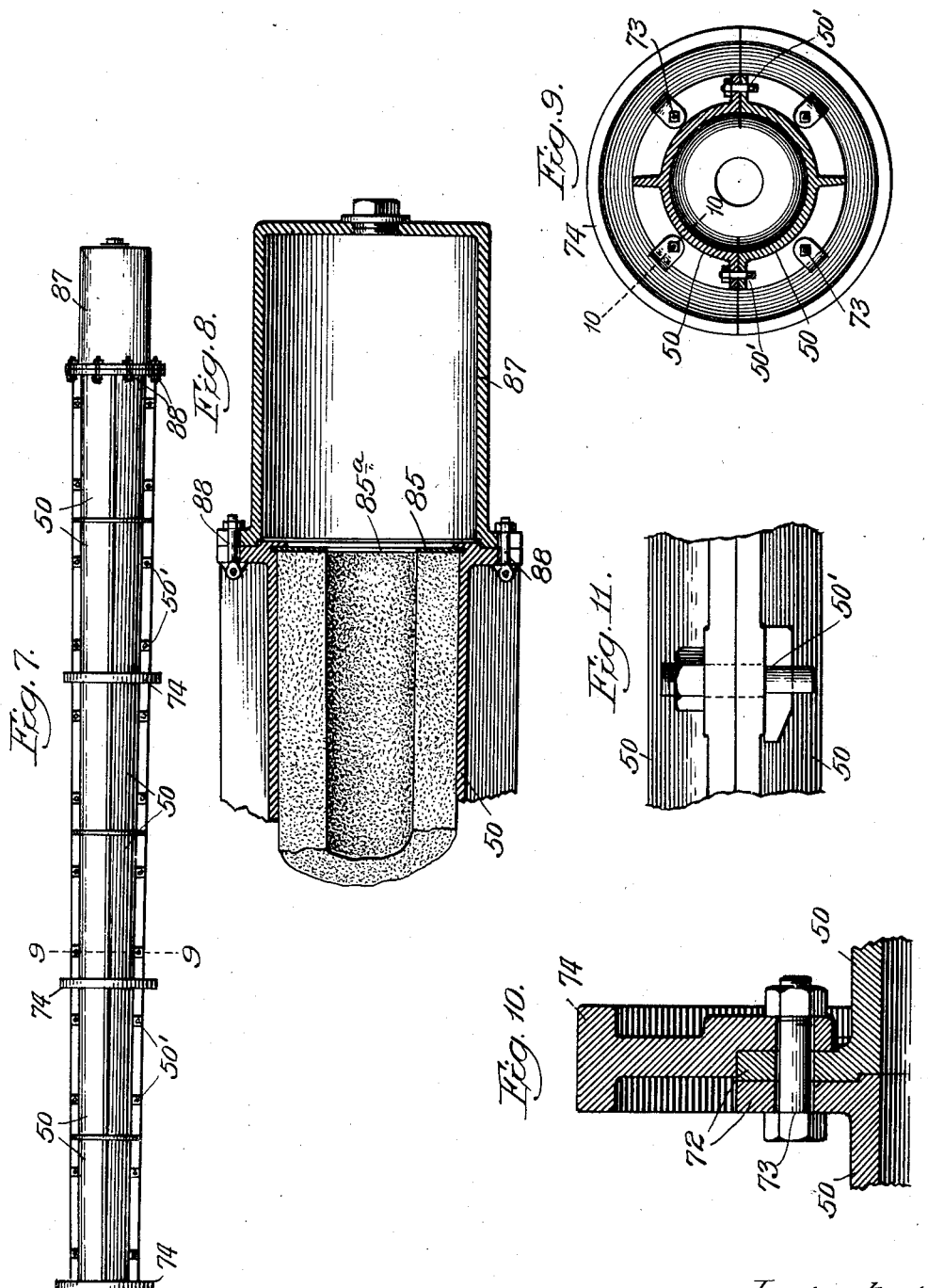

UNITED STATES PATENT OFFICE.

JULIUS J. GRUENFELD, JR., OF CHICAGO, ILLINOIS.

MACHINE FOR MAKING CONCRETE POLES.

1,374,730. Specification of Letters Patent. Patented Apr. 12, 1921.

Application filed September 22, 1920. Serial No. 412,038.

*To all whom it may concern:*

Be it known that I, JULIUS J. GRUENFELD, Jr., a citizen of the United States, and a resident of Chicago, in the county of Cook and State of Illinois, have invented certain new and useful Improvements in Machines for Making Concrete Poles, of which the following is a full, clear, and exact description.

The invention relates to centrifugal machines for making concrete poles.

The object of the invention is to provide a machine which is simple in construction, which can be readily loaded and unloaded and which may be operated in a comparatively small space.

The invention consists in the several novel features hereinafter set forth and more particularly defined by claims at the conclusion hereof.

In the drawings: Figure 1 is a plan of a machine embodying the invention.

Fig. 2 is a side elevation, parts being shown in section.

Fig. 3 is a section taken on line 3—3 of Fig. 2.

Fig. 4 is a section taken on line 4—4 of Fig. 2.

Fig. 5 is a section taken on line 5—5 of Fig. 2.

Fig. 6 is a detail side view of the brake device.

Fig. 7 is a detail plan of the mold.

Fig. 8 is a section through one end of the mold.

Fig. 9 is a section on line 9—9 of Fig. 7.

Fig. 10 is a section taken on line 10—10 of Fig. 9.

Fig. 11 is a detail of one of the bolt and wedge devices for securing the sections of the mold together.

The machine embodies a carrier which is adapted to receive the mold sidewise, in lieu of endwise as heretofore and is supported so that the molds may be loaded into and out of it sidewise, and for this purpose the carrier is preferably made up of channel beams 15 which form two sides of the carrier which are spaced apart to receive the mold therebetween, and heads 16 at the ends thereof and to which the channel-beams 15 are secured by bolts 17. Shafts 18 are secured in and project endwise from the heads respectively. Each of these shafts extends through and is supported in a pair of suitable bearings 21 on a bracket 21ª which rests upon a bed-plate 21ᵇ which is secured on the bed or foundation 23. Shafts 18 are rotatable in their bearings so that the entire carrier may be rotated to apply centrifugal force to the contents of a mold in the carrier. The heads 16 of the carrier are disposed apart sufficiently, so they will be located endwise of the ends of the mold for a pole of the desired length. Devices for removably holding the mold in the carrier coaxially with the shafts 18 comprise bars 24 secured to the beams 15 by bolts 25 and extending across the space between the beams and blocks 26 which are adjustably mounted on said bars. These blocks are provided with tapered seats 28 to receive flanges on the mold as hereinafter described. Each block 26 is adjustably secured to a bar 24 by bolts 29 which pass through slots 30. Adjusting-screws 31 are provided at the sides of the blocks so that the block may be accurately set to properly position the mold in the carrier. The fixed bars 24 and the block 26 serve as a support for the mold while the latter is being loaded or unloaded. Movable devices are provided at the opposite side of the carrier to coöperate with the blocks 26 on the bars 24 in holding the mold in the carrier during its rotation and these devices are movably connected to the carrier to permit their removal when the mold is to be loaded into or out of the carrier. These movable devices consist of bars 34 adjacent the ends of the carrier and a central frame 35. Each bar 34 has one of its ends pivoted in a lug 37 fixed to one of the beams 15 and its other end removably secured to the beam at the opposite side of a bolt-and-wedge device 39. The frame 35 is pivotally connected to lugs 40 which are fixed to one of the beams 15 by a rod 41 and its opposite end is removably secured to the other beam 15 by a device 39. Each device 39 (Fig. 5) consists of a threaded bolt 42, a nut 43 threaded to the bolt and provided with a tapered portion 44 to engage a corresponding shaped seat and a wedge 45 adapted to be driven through a slot 46 in the bolt to lock the movable holding device rigidly to the beams 15. A block 47 is adjustably secured to each of the bars 34 and frame 35 by bolt-and-slot connections 48 and is provided with a tapered seat 49 adapted to coöperate with the seats 28 on the blocks 26 to rigidly secure the mold in the carrier.

The mold is cylindrical and tapered, and is built up of semi-cylindrical sections 50 which are secured together by wedge-and-bolt devices 50′ which pass through abutting longitudinal flanges on the sections so the mold may be opened to remove the finished pole. One end of the mold is provided with a disk 85 to retain sufficient concrete in the mold, to form an annular wall of the desired thickness and this disk has an opening 85$^a$ to discharge the excess material. To catch the concrete discharged through the openings 85$^a$ in the disk 85, a hood 87 is provided. Said hood is removably secured to one end of the mold by bolts 88 which are pivotally connected to the end of the mold and permit the hood to be readily detached and attached to one end section of the mold.

The mold is also made up of longitudinal sections which have their abutting ends provided with flanges 72 which are secured together by bolts 73. In order to provide suitable rims or annular surfaces to be engaged by the supporting-blocks 26 and 47, rings 74 are secured to the joint flange 72 by bolts 73 and these rings are formed in arcuate sections which, when secured to the mold, form a complete ring.

Power is applied to one of the shafts 18 to rotate the carrier by a motor 75 which is provided with a pinion 76 to drive the gear 77 on said shaft. Fly wheels 78 are secured to the shafts 18 respectively and anti-friction thrust bearings 79 are provided between these wheels and the outer bearings 21. These fly wheels also serve as brake wheels or drums for stopping the rotation of the carrier. A brake is provided for each wheel 78 and each comprises a brake-shoe 80 fixed to a slide 81 which is guided between channeled guides 82 and the base of a bracket 21$^a$. A rod 83 is screw-threaded to the slide 81 and provided with a hand-wheel 84 by which the slide may be shifted to bring the brake-shoe 80 into or out of engagement with the wheel 78 to regulate the speed or gradually stop the carrier.

The operation of the improved machine will be as follows: When bars 34 and frame 35 are released and swung outwardly from one side of the carrier, the latter will be open between the heads 16 so that a mold may be deposited by a suitable hoist or crank into the carrier. In depositing the mold into the carrier, the rims 74 of the mold will be placed in the V-shaped seats 28 in blocks 26 on the fixed bars 24 so that the mold will be centralized in the carrier. Next, the bars 34 and frame 35 will be closed to bring the blocks 47 thereon into position to oppositely engage the rims 74 and secure the mold against longitudinal and transverse movement in the carrier. Power will then be applied to rotate the carrier until the concrete has been distributed therein by centrifugal force, as well understood in the art. When this has been done, the bars 34 and frame 35 will be unlocked and swung into open position, whereupon the mold with the formed pole therein can be removed.

The invention exemplifies a centrifugal machine for making concrete poles in which the carrier is adapted to receive the mold sidewise and the mold is adapted to be locked in the carrier during the rotation thereof. This operation may be effected with facility to rapidly produce concrete poles. The mechanism is simple in construction and can be operated in places where the necessary space for endwise insertion of the mold into the carrier is lacking.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a centrifugal machine for making concrete poles, the combination of a carrier, means adjacent the ends for revolubly supporting the carrier, the carrier being adapted to receive a mold sidewise between said supports, and means for removably securing the mold in the carrier.

2. In a centrifugal machine for making concrete poles, the combination of a carrier, means adjacent the ends for revolubly supporting the carrier, the carrier being adapted to receive a mold sidewise between and while held in said supports, and means for removably securing the mold in the carrier.

3. In a centrifugal machine for making concrete poles, the combination of a carrier comprising beams forming sides thereof, means for revolubly supporting the carrier, the beams being spaced apart to receive a mold sidewise therebetween, and means for removably securing the mold in the carrier.

4. In a centrifugal machine for making concrete poles, the combination of a carrier, means adjacent the ends for revolubly supporting the carrier, the carrier comprising means forming oppositely disposed sides with an opening therebetween adapted to receive the mold sidewise, and means for removably holding the mold in the carrier.

5. In a centrifugal machine for making concrete poles, the combination of a carrier, means adjacent the ends for revolubly supporting the carrier, the carrier comprising means forming oppositely disposed sides with an opening therebetween adapted to receive the mold sidewise, and adjustable means for removably holding the mold in the carrier.

6. In a centrifugal machine for making concrete poles, the combination of a carrier comprising longitudinal beams, means adjacent the ends for revolubly supporting the carrier, the beams forming oppositely disposed sides with an opening therebetween adapted to receive the mold sidewise, and means for removably holding the mold in the carrier, comprising cross-members secured to the beams and blocks on said cross-members.

7. In a centrifugal machine for making concrete poles, the combination of a carrier, comprising ends and sides between which a space is formed to contain the mold, and receive it sidewise, shafts projecting from the ends, bearings for the shafts disposed outwardly from the heads, and means to removably hold a mold in the carrier.

8. In a centrifugal machine for making concrete poles, the combination of a carrier, comprising heads and beams between which a space is formed to contain the mold, shafts projecting from the heads, bearings for the shafts disposed outwardly from the heads, and means for removably holding a mold in the carrier.

9. In a centrifugal machine for making concrete poles, the combination of a carrier, comprising heads and beams between which a space is formed to contain the mold, shafts projecting from the heads and bearings for the shafts disposed outwardly from the heads, and fixed and movable cross-bars between the beams for removably securing a mold in the carrier.

10. In a centrifugal machine for making concrete poles, the combination of a rotatable carrier adapted to receive a mold, means for removably securing the mold in the carrier, means for rotatably supporting the carrier, a wheel secured to rotate with the carrier and an adjustable brake for said wheel.

11. In a centrifugal machine for making concrete poles, the combination of a rotatable carrier adapted to receive a mold sidewise, means for removably securing the mold in the carrier, shafts at the ends of said carrier, means for rotatably supporting the shafts, wheels secured to rotate with the shafts and adjustable brakes for said wheels.

12. In a centrifugal machine for making concrete poles, the combination of a carrier adapted to receive a mold, a mold adapted to be placed in the carrier and having an opening in one end, means for supporting and rotating the carrier, and a hood removably secured to said end of the mold to catch the material discharged therefrom.

JULIUS J. GRUENFELD, Jr.